Patented Feb. 4, 1941

2,230,326

UNITED STATES PATENT OFFICE 2,230,326

DIOCTYLAMINE-ADIPIC ACID RESIN AND THE PRODUCTION THEREOF

Almon G. Hovey, Birmingham, and Theodore S. Hodgins, Royal Oak, Mich., assignors to Reichhold Chemicals, Inc., Formerly Beck, Koller & Company, Inc., Detroit, Mich.

No Drawing. Application December 17, 1938, Serial No. 246,488

6 Claims. (Cl. 260—78)

The invention relates broadly to improvements in resinous acid-amine condensation products and to the process of making the same, the present application being a continuation-in-part of our co-pending application Serial No. 147,569, filed June 10, 1937, now Patent No. 2,153,801, dated April 11, 1939, the disclosure of which is hereby incorporated by reference as part of the disclosure of the present case.

In the manufacture of alkyd resins it has been proposed to substitute the polyhydric alcohols, in whole or in part, by triethanol amine, which is an hydroxylated amine, and to react such hydroxylated amine with an organic carboxylic acid. In such reaction, however, the triethanol amine acts in a manner similar to glycerol and other polyhydric alcohols customarily employed in the manufacture of alkyd resins, owing to the presence of the hydroxyl groups which react with the organic acid in the well known manner.

It has also been proposed to employ certain organic amines in minor proportion as modifying agents in connection with various other ingredients employed in the manufacture of synthetic products. Furthermore various polyamines have been reacted with certain organic acids.

We have discovered that valuable resinous products having distinctive properties may be produced by reacting adipic acid and dioctylamine. The following example is given by way of illustration:

Example

One mol of adipic acid was reacted by fusing with one mol of dioctylamine at 136–270° C. for 30 minutes. The resulting water-white, resinous product had a cure time on the hot plate at 200° C. of 25 seconds. The resin was insoluble in water and soluble in acetone, alcohol and toluol, and to a limited extent in mineral spirits. This is useful as a component of a flexible baking enamel, or as a plasticizing resin for lacquers.

We claim:

1. A water-white resinous product produced by fusing together one mol of adipic acid and one mol of dioctylamine, which product has a cure time on a hot plate of 25 seconds at 200° C., is insoluble in water, soluble in acetone, alcohol and toluol and to a limited extent in mineral spirits, said acid and said amine constituting the principal reacting ingredients.

2. A resinous product formed by fusing together adipic acid and dioctylamine, said acid and amine constituting the principal reacting ingredients.

3. A water-white resinous condensation product insoluble in water but soluble in acetone, alcohol and toluol, and to a limited extent in mineral spirits, said product being formed by fusing one mol of adipic acid with one mol of dioctylamine, said acid and said amine constituting the principal reacting ingredients.

4. A process which comprises fusing together dioctylamine and adipic acid to produce a resinous reaction product, said acid and said amine constituting the principal reacting ingredients.

5. A process which comprises fusing together one mol of adipic acid and one mol of dioctylamine to produce a resinous reaction product, said acid and said amine constituting the principal reacting ingredients.

6. A process which comprises fusing together one mol of adipic acid and one mol of dioctylamine at about 136–270° C. for about 30 minutes, said acid and said amine constituting the principal reacting ingredients.

ALMON G. HOVEY.
THEODORE S. HODGINS.